(12) United States Patent
Matsumoto et al.

(10) Patent No.: US 8,128,440 B2
(45) Date of Patent: Mar. 6, 2012

(54) ELECTRICAL CONNECTOR WITH DETACHABLE COVER

(75) Inventors: Mitsuhiro Matsumoto, Makinohara (JP); Hajime Kato, Makinohara (JP); Suminori Arima, Makinohara (JP); Shinji Ichikawa, Toyota (JP)

(73) Assignees: Yazaki Corporation, Tokyo (JP); Toyota Jidosha Kabushiki Kaisha, Aichiken (JP)

( * ) Notice: Subject to any disclaimer, the term of this patent is extended or adjusted under 35 U.S.C. 154(b) by 0 days.

(21) Appl. No.: 12/696,482

(22) Filed: Jan. 29, 2010

(65) Prior Publication Data

US 2010/0197171 A1   Aug. 5, 2010

(30) Foreign Application Priority Data

Feb. 4, 2009   (JP) .................................. 2009-023361

(51) Int. Cl.
*H01R 13/514*   (2006.01)
(52) U.S. Cl. ....................................................... 439/731
(58) Field of Classification Search .................. 439/731, 439/902, 906, 588, 687, 607.56, 607.57, 439/607.58, 310
See application file for complete search history.

(56) References Cited

U.S. PATENT DOCUMENTS

| | | | | |
|---|---|---|---|---|
| 4,806,112 A * | 2/1989 | Roberts et al. | ................ | 439/144 |
| 4,822,297 A * | 4/1989 | Prince et al. | ................... | 439/395 |
| 4,964,815 A * | 10/1990 | Kawai et al. | ............. | 439/607.25 |
| 5,190,475 A * | 3/1993 | Dickens | ........................ | 439/588 |
| 5,197,901 A * | 3/1993 | Hashiguchi | .................... | 439/352 |
| 5,383,794 A * | 1/1995 | Davis et al. | ..................... | 439/352 |
| 5,417,590 A * | 5/1995 | Dechelette et al. | ...... | 439/607.48 |
| 5,505,637 A * | 4/1996 | Kramer et al. | .......... | 439/607.48 |
| 5,511,993 A * | 4/1996 | Yamada et al. | ............ | 439/607.5 |
| 5,751,135 A | 5/1998 | Fukushima et al. | | |
| 5,762,520 A * | 6/1998 | Martin | ........................ | 439/470 |
| 5,788,534 A * | 8/1998 | Koegel et al. | ................. | 439/465 |
| 5,820,395 A | 10/1998 | Hashizawa | | |
| 5,908,327 A * | 6/1999 | Tsuji et al. | .................... | 439/470 |
| 5,967,830 A * | 10/1999 | Tsuji | .............................. | 439/470 |
| 6,010,354 A * | 1/2000 | Cunningham | ............... | 439/417 |
| 6,019,638 A * | 2/2000 | Saka et al. | ................ | 439/620.15 |
| 6,071,145 A * | 6/2000 | Toly | .............................. | 439/485 |
| 6,102,733 A * | 8/2000 | Anderson et al. | ............ | 439/535 |
| 6,109,969 A * | 8/2000 | Kuo et al. | ................. | 439/607.41 |
| 6,123,569 A | 9/2000 | Fukushima et al. | | |
| 6,398,594 B1 * | 6/2002 | Bonilla et al. | ................ | 439/731 |
| 6,609,931 B2 * | 8/2003 | Parrish et al. | ................ | 439/578 |

(Continued)

FOREIGN PATENT DOCUMENTS

JP   9-161882 A   6/1997

(Continued)

*Primary Examiner* — Tulsidas C Patel
*Assistant Examiner* — Harshad Patel
(74) *Attorney, Agent, or Firm* — Sughrue Mion, PLLC

(57) ABSTRACT

A connector 1 includes: a connector housing 2; a case 3; and a cover 4. The connector housing 2 receives terminals. The case 3 is coupled to the connector housing 2, and receives ends of electric wires 7 connected to the terminals in the connector housing 2. The cover 4 includes a pair of cover bodies 41, 42, a locking arm, and a receiving member 6. The pair of cover bodies 41, 42 are attached to an outside of the case 3, and attached to each other to cover an outer wall 3b of the case 3. The locking arm is mounted on a one cover body 41. The receiving member is mounted on the other cover body 42 and engaged with the locking arm 41.

2 Claims, 4 Drawing Sheets

U.S. PATENT DOCUMENTS

| | | | |
|---|---|---|---|
| 6,619,987 B2* | 9/2003 | Kumamoto et al. | 439/607.46 |
| 6,663,415 B1* | 12/2003 | Wu | 439/460 |
| 6,726,501 B2* | 4/2004 | Waddell et al. | 439/352 |
| 7,021,959 B2* | 4/2006 | Tsuji et al. | 439/470 |
| 7,081,003 B1* | 7/2006 | Gregori et al. | 439/352 |
| 7,226,316 B2* | 6/2007 | Wu | 439/607.44 |
| 7,422,470 B2* | 9/2008 | Tsuji | 439/470 |
| 7,476,121 B2* | 1/2009 | Tsuji | 439/471 |
| 7,544,095 B2* | 6/2009 | Droesbeke et al. | 439/607.41 |
| 2002/0155751 A1* | 10/2002 | Kato | 439/473 |
| 2004/0102082 A1* | 5/2004 | Tsuji et al. | 439/470 |

FOREIGN PATENT DOCUMENTS

| | | |
|---|---|---|
| JP | 9-161884 A | 6/1997 |
| JP | 9-161898 A | 6/1997 |
| JP | 2007207726 | 8/2007 |

* cited by examiner

ELECTRICAL CONNECTOR WITH DETACHABLE COVER

CROSS REFERENCE TO RELATED APPLICATIONS

This application is on the basis of Japanese Patent Application No. 2009-023361, the contents of which are hereby incorporated by reference.

BACKGROUND OF THE INVENTION

1. Field of the Invention

The present invention relates to a connector including: a connector housing receiving terminals; and a case coupled to the connector housing and receiving ends of electric wires connected to the terminals in the connector housing, and relates to a connector to be connected to a power-receiving connector connected to a power-supply device in a vehicle such as an electric vehicle or a plug-in hybrid vehicle.

2. Description of the Related Art

A power-supply device including a plurality of batteries are mounted on a vehicle which is moved by a driving force of an electric motor such as an electric vehicle or a plug-in hybrid vehicle, and accumulates and discharges electric power. For charging the power-supply device, a power-receiving connector is mounted on a vehicle body of the vehicle. The power-supply device is charged by connecting the power-receiving connector with a power-supplying connector (for example, see Patent Document 1 to 3) connected to a battery charger or a home power supply via an electric wire.

The power-supplying connector includes: a connector housing receiving terminals; and a case coupled to the connector housing and receiving ends of electric wires connected to the terminals in the connector housing. The case includes a pair of case bodies made of insulating synthetic resin.

The pair of case bodies is formed substantially symmetrically. The pair of case bodies is assembled as the case such that end faces of the respective case bodies are overlapped with each other while one end of the housing is caught by the case bodies. Further, bolt holes are formed on respective case bodies. When the case bodies are assembled, the bolt holes communicate with each other. A bolt inserted into the bolt holes and a nut fix the pair of case bodies to each other.

When charging the vehicle, the case of the power-supplying connector is caught and moved to around the power-receiving connector, and the power-supplying connector is connected to the power-receiving connector. When the charge is finished, the case of the power-supplying connector is again caught, and the connection between the power-supplying connector and the power-receiving connector is released, and then the power-supplying connector is moved away from the power-receiving connector, namely, the vehicle.

[Patent Document 1] JP-A-H09-161882
[Patent Document 2] JP-A-H09-161884
[Patent Document 3] JP-A-H09-161898

Because the connecting works and the releasing works between the power-supplying connector and the power-receiving connector are frequently performed, the case may be damaged when the power-supplying connector falls down, or the case may become dirty due to a long time use. However, the case is a part of the assembled power-supplying connector, and if the case is disassembled, the electric wires are exposed, and a connector housing may be unfastened. Therefore, a user cannot easily exchange the case with a new case, and it is necessary to exchange the whole power-supplying connector. Thus, a maintenance cost is increased. Further, the nut and the bolt fix the pair of case bodies. Because the bolt and the nut are exposed on outer surfaces of the case bodies, a user can easily disassemble the case. Therefore, there is a security problem.

Further, because the case has a lot of chances for public exposure during the charge, it is desired that the case has a good design. However, when a design is painted on an outer surface of the case, the design is easy to be removed due to a falling of the case or a long time use of the case. Further, if the design on the case is removed, the case cannot easily be exchanged as described above. Accordingly, a color of the resin of which the case is made may be changed uniformly, or a plurality of resin having different colors may be used to make a design. However, there is a problem that the color of the resin is limited, and the design made by resin is monotonous.

Accordingly, an object of the present invention is to solve such a problem. Namely, the object of the present invention is to provide a connector to protect a case, and to allow the case to easily change a design thereof.

SUMMARY OF THE INVENTION

In order to attain the object, according to the present invention, there is provided a connector including:
a connector housing for receiving terminals;
a case coupled to the connector housing for receiving ends of electric wires connected to the terminals in the connector housing; and
a cover attached to an outside of the case for covering an outer wall of the case.

Preferably, the cover includes:
a pair of cover bodies attached to each other for covering the outer wall of the case;
a rocking member mounted on one of the pair of the cover bodies;
a receiving member mounted on the other of the pair of the cover bodies to be engaged with the rocking member.

Preferably, the connector further includes:
a positioning member for relatively positioning the cover and the case.

These and other objects, features, and advantages of the present invention will become more apparent upon reading of the following detailed description along with the accompanied drawings.

BRIEF DESCRIPTION OF THE DRAWINGS

FIG. 4b is a sectional view showing an engagement state between a rocking arm and a receiving member shown in FIG. 4a.

DETAILED DESCRIPTION OF THE PREFERRED EMBODIMENTS

Figure 1:
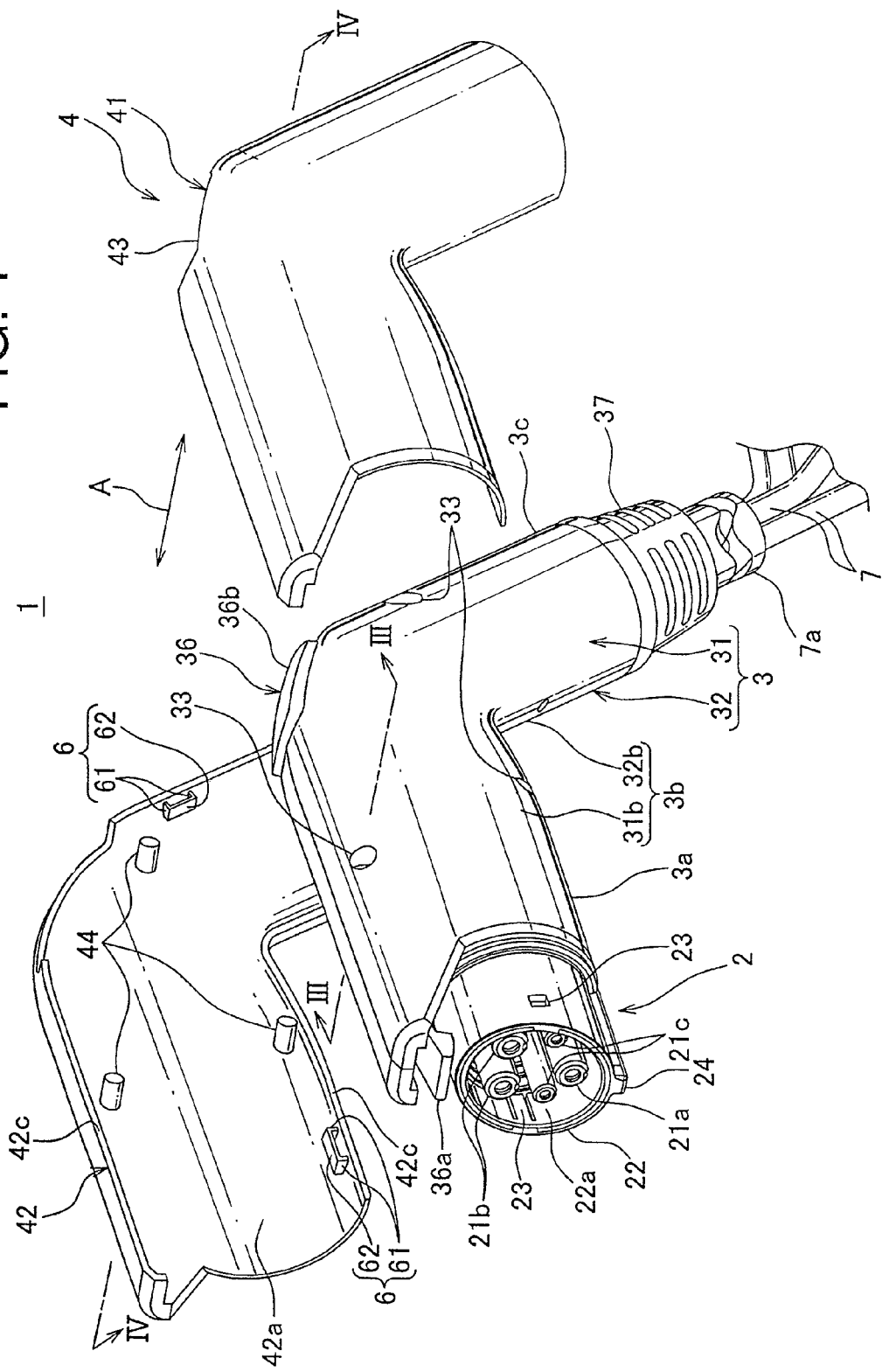
FIG. 1 is an exploded perspective view showing a connector according to an embodiment of the present invention.

Hereinafter, a connector 1 according to an embodiment of the present invention will be explained with reference to FIGS. 1 to 4. The connector 1 is a power-supplying connector mounted on an end of a charging code, and to be connected to a power-receiving connector connected to a power-supply device in a vehicle such as an electric vehicle or a plug-in hybrid vehicle. As shown in FIG. 1, the connector 1 includes: a connector housing 2; a case 3; a locking lever 36; an electric wire guide 37; and a cover 4. The cover 4 includes a notch 43 exposing the locking lever for locking with a mating connector.

The connector housing 2 is made of insulating synthetic resin, and integrally includes a plurality of terminal receiving members 21a, 21b, 21c and a hood 22. The terminal receiving members 21a, 21b, 21c are formed in a cylinder shape, and arranged parallel to each other with gaps. An inside of each of terminal receiving members 21a, 21b, 21c is formed as a terminal receiving chamber to receive one terminal. The terminal receiving chambers are formed in a straight hole and arranged parallel to each other.

Inner diameters of the terminal receiving members 21a, 21b, 21c correspond to outer diameter of the terminals to be received. The terminal receiving member 21a is the most projected toward the power-receiving connector of the terminal receiving members 21a, 21b, 21c, and receives a ground terminal. Therefore, when the connector 1 is moved close to the power-receiving connector, firstly the ground terminals are connected to each other, and then the other terminals are connected. Outer diameters of the terminal receiving members 21b are a little larger than that of the terminal receiving member 21a, and receive charging terminals. Outer diameters of the terminal receiving members 21c are a little smaller than those of the terminal receiving members 21a, 21b, and receive signal terminals.

These terminals described above are so-called female terminals, and made by pressing a conductive metal plate. The terminal integrally includes an electric contact part and a wire connecting part. The electric contact part is electrically and mechanically connected to a mating terminal of the power-receiving connector when the connector 1 is connected to the power-receiving connector. The wire connecting part is electrically and mechanically connected to an electric wire 7 corresponding to the terminal.

The electric wire 7 is a so-called covered wire, and includes a conductive core wire and an insulating cover. A plurality of electric wires 7 is provided corresponding to the terminals. A wire protector 7a is attached to parts where the electric wires 7 are guided out. The wire protector 7a is made of insulating and flexible material such as a rubber or an elastomer, and formed in an oblong tubular shape. A one end of the electric wire 7 is connected to the terminal, and the other end is connected to a plug of a battery charger or a home power supply.

The hood 22 is formed in a cylinder shape, and receives a plurality of terminal receiving members 21a, 21b, 21c therein. The hood 22 is formed integrally with the terminal receiving members 21a, 21b, 21c such that an inner wall in the center axis direction is continued to outer walls of the terminal receiving members 21a, 21b, 21c in the center axis direction. A one opening 22a of the hood 22 is disposed outside of the case 3, and the other opening is disposed inside of the case 3.

At the opening 22a, the inner wall of the hood 22 is separated from outer walls of the terminal receiving members 21a, 21b, 21c. The opening 22a of the hood 22 is engaged with the power-receiving connector. An engaging part 23 for engaging with a connector housing of the power-receiving connector is formed on the hood 22 at the opening 22a side.

Further, at the opening 22a side, a length of the hood 22 nearest to the terminal receiving member 21a is the longest, and as the hood 22 is further away from the terminal receiving member 21a, the length of the hood 22 becomes shorter.

Further, a positioning rib 24 for the power-receiving connector is formed on an outer wall of the longest hood 22, and extended in the center axis direction of the hood 22.

The case 3 includes a pair of case bodies 31, 32 made of insulating synthetic resin. The pair of case bodies 31, 32 is formed substantially symmetrically, and formed in a tub shape having an L-shaped curve portion. Both end walls in a width direction of a one case body 31 is overlapped with both end walls in the width direction of the other case body 32, and they are assembled as the case 3 formed in a cylinder shape having substantially L-shaped curve portion.

The connector housing 2 and the locking lever 36 are positioned in an opening formed at a one end 3a in a longitudinal direction of the case 3 so that they fill the opening. Further, the electric wire guide 37 is positioned in an opening formed at the other end 3c in the longitudinal direction of the case so that the wire guide 37 fills the opening. Ribs extending along a circumferential direction is formed on both inner walls 31a, 32a at both ends in the longitudinal direction of the case bodies 31, 32. Further, a groove extending along a circumferential direction is formed on an outer wall of the hood 22 of the connector housing 2 in the center of the center axis. A groove extending along the circumferential direction is formed on an outer wall at an end of the electric wire guide 37. Then, the case 3 is assembled by positioning the respective ribs in the respective grooves, sandwiching the connector housing 2 between the one ends of the case bodies 31, 32 in the longitudinal direction, and sandwiching the electric wire guide 37 between the other ends of the case bodies 31, 32. Thus, the case 3 is coupled to the connector housing 2 at the one end 3a side in the longitudinal direction, and coupled to the electric wire guide 37 at the other end 3c side.

Figure 3:
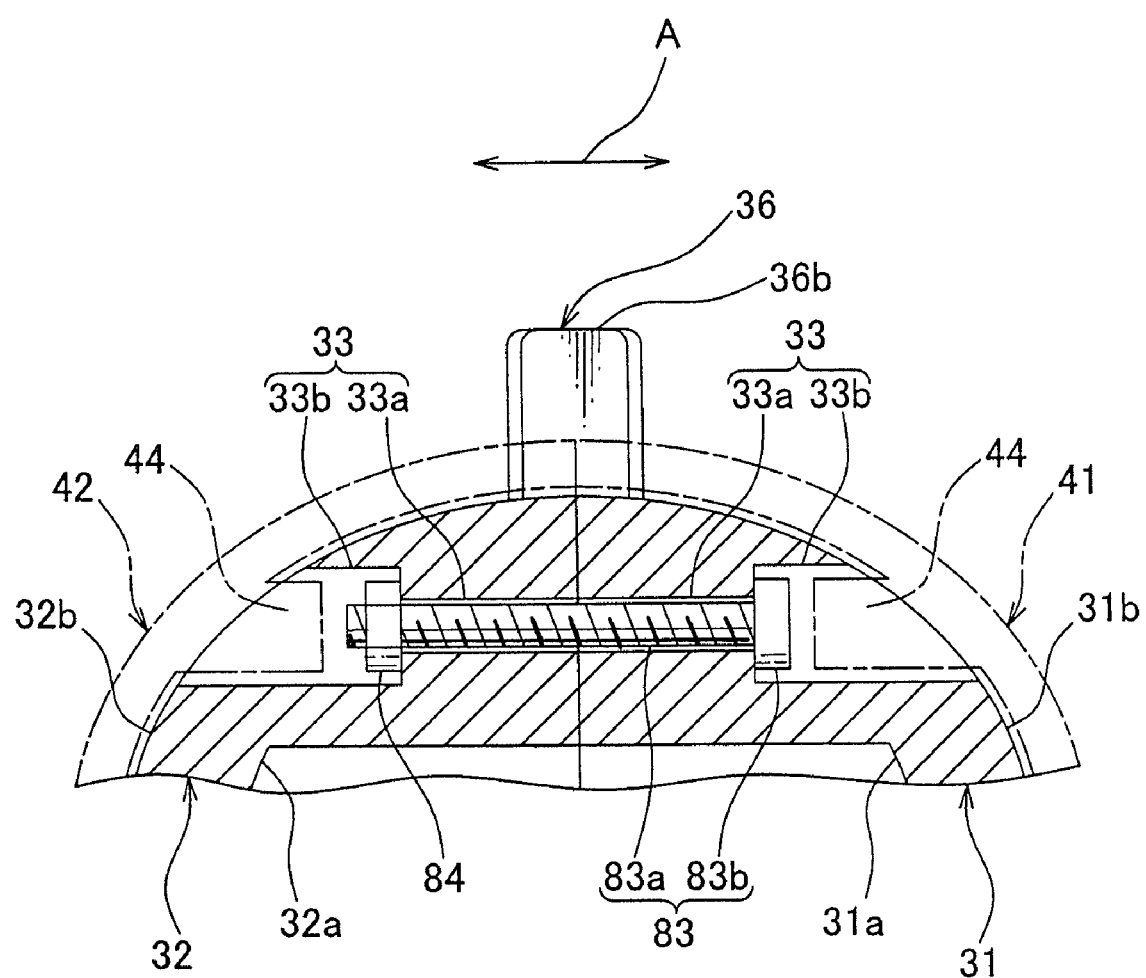
FIG. 3 is a sectional view taken on line III-III in FIG. 1.

In the case 3 assembled in this manner, the electric wires 7 connected to the terminals in the connector housing 2 are guided into the inside of the case 3 via an opening at the one side 3a in the longitudinal direction, and guided out from an opening at the other end 3c of the case 3 via the electric wire guide 37. Thus, the ends of the electric wires 7 are positioned in the inside of the case. Further, as shown in FIGS. 1 and 3, a plurality of bolt holes 33 are formed on the case 3 for bolting the assembled case 3. The bolt holes 33 are arranged around end walls of the one case body 31 overlapped with the other case body 32, and arranged around end walls of the other case body 32 overlapped with the one case body 31. The bolt holes 33 penetrate the outer walls of the case bodies 31, 32. The bolt holes 33 are so arranged that when the case 3 is assembled, the bolt holes of the case body 31 respectively communicate with the bolt holes of the case body 32.

As shown in FIG. 3, the bolt hole 33 includes a small-diameter hole 33a and a large-diameter hole 33b coaxially continuing to the small-diameter hole 33a. These small-diameter hole 33a and large-diameter hole 33b are round holes. The small-diameter holes 33a are formed near the inner walls 31a, 32a of the case bodies 31, 32. An inner diameter of the small-diameter hole 33a is larger than an outer diameter of a shaft 83a of a bolt 83, and smaller than an outer diameter of a head 83b of the bolt 83 (or nut 84). The large-diameter holes 33b are formed near the outer walls 31b, 32b of the case bodies 31, 32. An inner diameter of the large-diameter hole 33b is larger than the inner diameter of the small-diameter hole 33a and the outer diameter of the head 83b of the bolt 83 (or nut 84).

When the case 3 is assembled, the bolt hole 33 of the case body 31 communicates with the bolt hole 33 of the case body 32. Then, the shaft 83a of the bolt 83 is inserted into one of the bolt holes 33, and the nut 84 is screwed onto the shaft 83a projected from the other bolt hole 33 to bolt the assembled case 3. A later-described positioning boss 44 (indicated by a chain line in FIG. 3) of the cover 4 is inserted into a remaining space other than a space where the head 83b of the bolt 83 (or nut 84) is positioned in the large-diameter hole 33b.

The locking lever 36 is made of insulating synthetic resin, and formed in a bar shape. As shown in FIG. 1, a locking projection 36a for engaging with the connector housing of the power-receiving connector is formed on an end of the locking lever 36 in a longitudinal direction. Further, a locking button 36b for operating the locking lever 36 is formed on the other end of the locking lever 36 in the longitudinal direction.

The locking lever 36 is received in the case 3 and rotatably supported by the case bodies 31, 32 around the center in the longitudinal direction while the locking projection 36a is projected out of the case 3 from an opening near the one end 3a of the case 3 in the longitudinal direction, and the locking button 36b is projected out of the case 3 from an opening at the center in the longitudinal direction. Further, the other end of the locking lever 36 in the longitudinal direction is pressed outward from the case 3 by a coil spring, and the locking projection 36a is pressed inward of the case 3.

The electric wire guide 37 is made of insulating and elastic material such as a rubber or an elastomer, and formed in a substantially cylinder shape of which inner and outer diameters are gradually smaller as the electric wire guide 37 extends from the one end to the other end in the center axis direction. The electric wire guide 37 is attached to the other end 3c of the case 3 in the longitudinal direction. The wire protector 7a is inserted into the electric wire guide 37, and the electric wires 7 are guided out of the case 3 via the electric wire guide 37.

The cover 4 is made of insulating synthetic resin, and as shown in FIG. 1, the cover 4 includes: a pair of cover bodies 41, 42; a locking arm 5 as a locking member (FIG. 4); a receiving member 6; and a positioning boss 44.

The pair of caver bodies 41, 42 are formed symmetrically, and respectively formed in a tub shape having a substantially L-shaped curve portion. An inner shape of the one cover body 41 is substantially the same as an outer shape of the one case body 31. The size and the shape of the one cover body 41 are large enough to cover the whole outer wall of the one case body 31. An inner shape of the other cover body 42 is substantially the same as an outer shape of the other case body 32. The size and the shape of the other cover body 42 are large enough to cover the whole outer wall of the other case body 32. A notch to form a hole through which the locking button 36b of the locking lever 36 is inserted when the cover 4 is assembled is formed on each of end walls 41c, 42c overlapped with each other of the cover bodies 41, 42.

The one cover body 41 is attached to an outside of the one case body 31 so that an inner wall 41a of the one cover body 41 overlaps the outer wall 31b of the one case body 31. The other cover body 42 is attached to an outside of the other case body 32 so that an inner wall 42a of the other cover body 42 overlaps the outer wall 32b of the other case body 32. Then, both end walls 41c, 41c of the one case body 41 in a width direction are overlapped with both end walls 42c, 42c of the other cover body 42 in the width direction to be assembled as a cylindrical cover 4 having a substantially L-shaped curve portion.

Thus, the cover 4 is attached to the outside of the case 3 to cover the outer wall 3b of the case 3. An arrow A indicates a direction in which the pair of cover bodies 41, 42 are moved close to or away from each other when the cover is assembled or disassembled, and referred to as an attaching direction A.

Figure 4A:
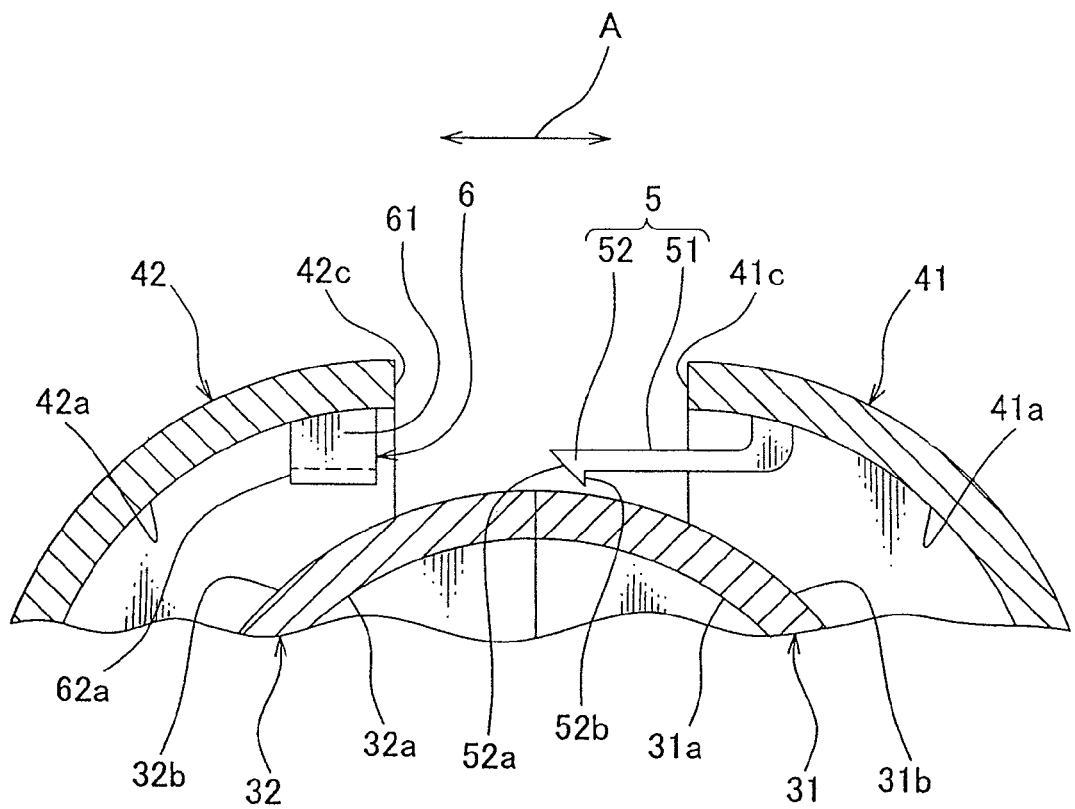
FIG. 4a is a sectional view taken on line IV-IV in FIG. 1.
Figure 4B:
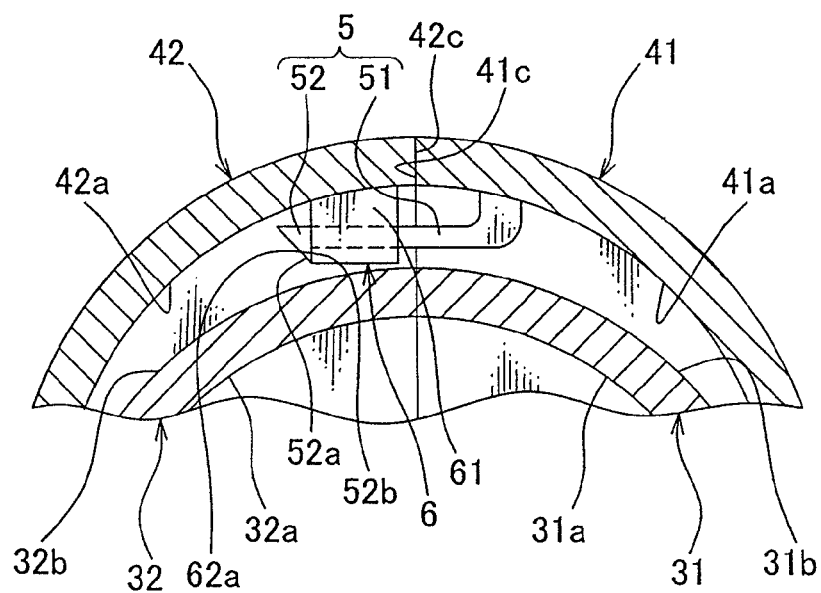

The locking arm 5 is formed near both end walls 41c, 41c of the one cover 41. A plurality of locking arms 5 is formed corresponding to the receiving members 6 of the other cover 42 shown in FIG. 1 (Only one locking arm is shown in FIGS. 4a and 4b). The locking arm 5 includes an arm main body 51 and a locking projection 52.

The arm main body 51 is formed in a band shape, and extended in the attaching direction A. One end of the arm main body 51 in the longitudinal direction is extended to the inner wall 41a of the one cover body 41, and the other end is a free end disposed near the other cover body 42. The arm main body 51 is elastically deformable in a direction close to an outside of the cover 4 (Upper direction in FIGS. 4a and 4b).

The locking projection 52 is projected from an outer wall of the arm main body 51 near an inside of the cover 4. The locking projection 52 has a tapered wall 52a and a locking wall 52b. The tapered wall 52a faces the other cover body 42, and is so tapered relative to the attaching direction A that as the tapered wall 52a extends closer to the other cover body 42, the tapered wall 52a extends closer to the outer wall of the arm main body 51. The locking wall 52b is formed on the locking projection 52 away from the other cover body 42, and is a flat wall perpendicular to the attaching direction A.

As shown in FIGS. 1 and 4, a plurality of receiving members 6 is formed near both end walls 42c, 42c of the other cover body 42. The receiving member 6 is overlapped with the locking arm 5 when the cover 4 is assembled. The receiving member 6 is engageable with the locking arm 5. The receiving member 6 includes a pair of standing pieces 61, 61 projecting from the inner wall 42a of the other cover body 42, and a connecting piece 62 to connect top ends of the standing pieces 61, 61, and is formed in a C-shape.

The pair of standing pieces 61, 61 is formed in a rectangular plate shape, and arranged perpendicular to the attaching direction A. The pair of standing pieces 61, 61 faces to each other with a gap larger than a width of the arm main body 51.

The connecting piece 62 is formed in a rectangular plate shape, and separated from the inner wall 42a of the other cover body 42 with a gap. This gap positions the arm main body 51 in a neutral state (not deformed state), and prevents the locking projection 52 from entering the gap when the arm main body 51 is in the neutral state. Further, an end wall 62a of the connecting piece 62 away from the one cover body 41 is formed flat perpendicular to the attaching direction A.

When the pair of cover bodies 41, 42 is moved close to each other from a state shown in FIG. 4a, the locking projection 52 of the locking arm 5 is inserted into the receiving member 6, and the tapered wall 52a of the locking projection 52 contacts the connecting piece 62 of the receiving member 6. Then, the tapered wall 52a elastically deforms the arm main body 51 toward an outside of the cover 4, and the locking projection 52 is further inserted into the receiving member 6 while the locking projection 52 slides on an inner wall of the connecting piece 62.

Then, as shown in FIG. 4b, when the locking projection 52 is passed through the receiving member 6 and positioned outside of the receiving member 6, the arm main body 51 is elastically restored, and the locking wall 52b of the locking projection 52 is engaged with the end wall 62a of the connecting piece 62. Thus, the locking arm 5 is engaged with the receiving member 6, and the pair of cover bodies 41, 42 is attached to each other.

As shown in FIG. 1, a plurality of positioning bosses 44 (only the positioning boss 44 for the cover body 42 is shown in FIG. 1) is disposed corresponding to the bolt holes 33 of the case 3 near the end walls 41c, 41c, 42c, 42c of the cover bodies 41, 42 respectively. The positioning bosses 44 are projected toward insides of the cover bodies 41, 42 from the inner walls 41a, 42a of the cover bodies 41, 42 in the attaching direction A. The positioning boss 44 is formed in a cylinder shape, and an outer diameter of the positioning boss 44 is smaller than the inner diameter of the large-diameter hole 33b of the bolt hole 33.

As shown in FIG. 3, when the cover bodies 41, 42 are moved close to the case 3, the positioning bosses 44 are inserted into the bolt holes 33 and position the cover 3 relative to the cover bodies 41, 42 (namely, cover 4). Thus, the bolt hole 33 and the positioning boss 44 compose the positioning member described in claims.

When the connector 1 is assembled, firstly, the electric wires 7 having the wire protector 7a are inserted into the electric wire guide 37, and the ends of the electric wires 7 are connected to the terminals. Then, the terminals are inserted into the terminal receiving chambers of the terminal receiving members 21a, 21b, 21c so that the connector housing 2 receives the terminals.

Next, the connector housing 2 is sandwiched between the case bodies 31, 32 near the one ends thereof in the longitudinal direction, and the electric wire guide 37 is sandwiched between the case bodies 31, 32 near the other ends thereof so that the case 3 is assembled and the ends of the electric wires 7 are positioned in the case 3. Then, the case 3 is fastened with the bolts.

Then, as shown in FIG. 1, the one cover body 41 covers the one case body 31, the other cover body 42 covers the other case body 32, and the cover bodies 41, 42 are moved close to each other in the attaching direction A. Then, when the positioning bosses 44 of the cover bodies 41, 42 are inserted into the bolt holes 33 of the case bodies 31, 32, the cover bodies 41, 42 are positioned at predetermined positions covering the outer walls 31b, 32b of the case bodies 31, 32.

Figure 2:
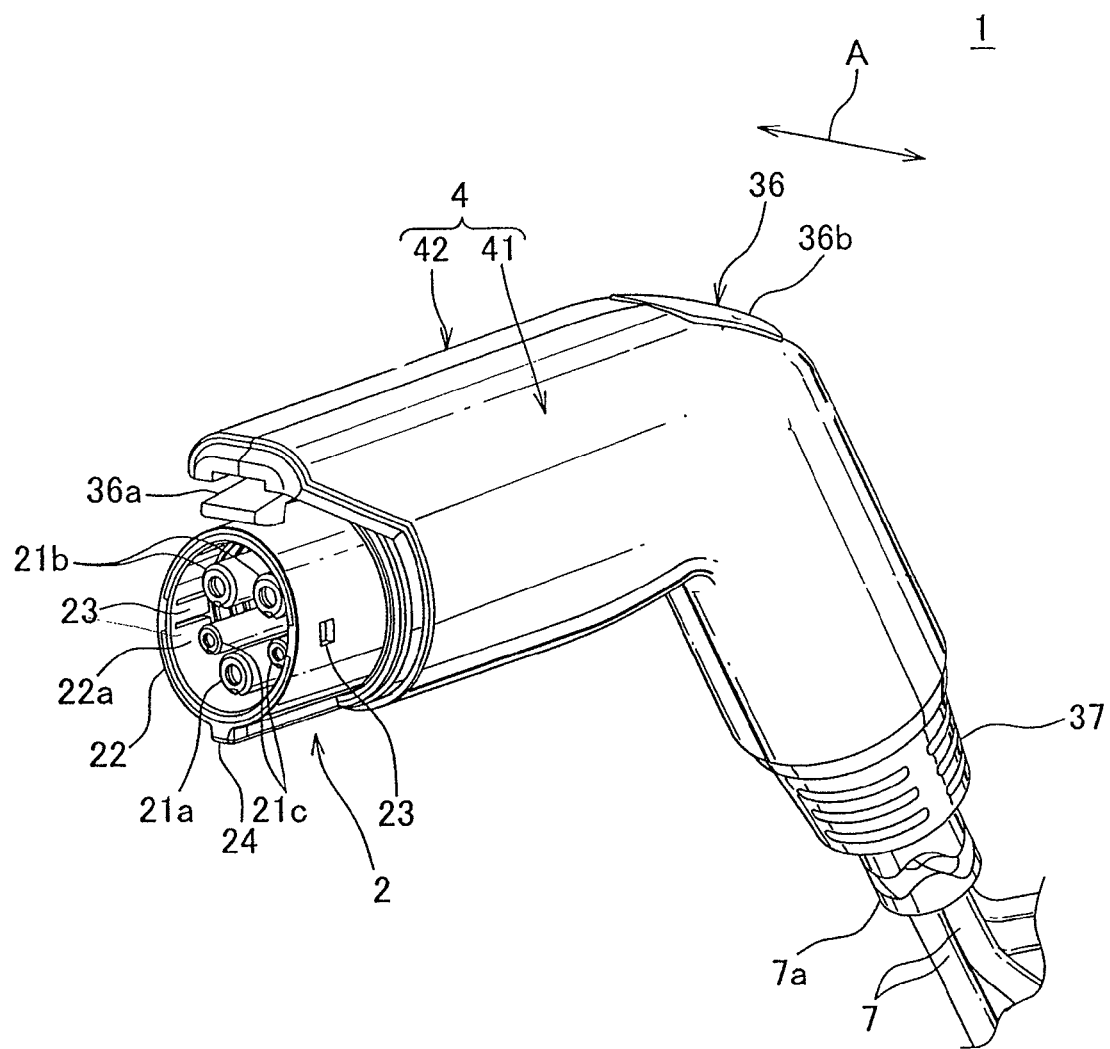
FIG. 2 is a perspective view showing an assembled connector of FIG. 1.

Then, when the cover bodies 41, 42 are further moved close to each other, the locking arm 5 is engaged with the receiving member 6 so that the pair of cover bodies 41, 42 are attached to each other, and the cover 4 is attached to an outside of the case 3 to cover the case 3. Thus, the connector 1 shown in FIG. 2 is assembled. A user can catch the cover 4 of the connector 1 to engage with the power-receiving connector and can charge the power-supply device of a vehicle.

According to this embodiment, because the cover 4 covers the case 3, the cover 4 is damaged or tainted prior to the case 3 to protect the case 3 against damage or taint. Further, when the cover 4 is damaged or tainted, only the cover 4 is changed, and maintenance cost can be reduced. Further, because the cover 4 covers the case 3, a user cannot easily disassemble the bolting case 3, and the security of the connector 1 is improved. Further, because the design of the case 3 is easily changed by replacing the cover 4, design flexibility of the case 3, namely, connector 1 is improved.

Further, when the locking arm 5 is engaged with the receiving member 6, the pair of cover bodies 41, 42 is attached to each other, and the cover 4 is attached to the case 3. Therefore, the cover 4 is easily attached to the case 3 without using other members such as bolt 83 or nut 84, and a jig.

Further, when the positioning bosses 44 of the cover bodies 41, 42 are inserted into corresponding bolt holes 33 of the case bodies 31, 32, the cover bodies 41, 42 (namely, cover 4) are positioned relative to the case 3. Therefore, the cover 4 can be easily and surely attached to the predetermined position of the case 3.

According to this embodiment, the connector 1 is a power-supplying connector. However, the connector 1 may be a connector other than the power-supplying connector. Further, in this embodiment, the locking arm 5 is engaged with the receiving member 6. However, various shapes can be used as the locking member and the receiving member as long as they can be engaged with each other. Further, according to this embodiment, the bolt hole 33 is used as a positioning hole. However, other holes may be formed for positioning the bosses 44.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A connector comprising:
 a connector housing for receiving terminals;
 a case coupled to the connector housing by assembling a pair of case bodies with fastening means inserted into a plurality of insertion holes communicating the pair of case bodies, and positioning the connector housing and for receiving ends of electric wires connected to the terminals in an inside thereof;
 a cover composed of a pair of cover bodies attached to each other for covering an outer wall of the case, and having a notch exposing a locking lever for locking the connector with a mating connector, and positioning members for positioning the cover relative to the case,
 wherein the positioning members of the cover are cylindrical bosses projected toward an inside of the cover at positions corresponding to the insertion holes of the case, each having an outer diameter smaller than an inner diameter of each insertion hole.

2. The connector as claimed in claim 1, wherein the cover further includes:
 a locking member mounted on one of the pair of the cover bodies;
 a lock-receiving member mounted on the other of the pair of the cover bodies to be engaged with the locking member.

* * * * *